(12) United States Patent
Huang et al.

(10) Patent No.: US 11,727,453 B2
(45) Date of Patent: Aug. 15, 2023

(54) DETERMINISTIC VALIDATION OF BILLING INTEGRATIONS THROUGH SIMULATED TIME

(71) Applicant: Stripe, Inc., San Francisco, CA (US)

(72) Inventors: Ji Huang, Bothell, WA (US); Adam Eagle, San Francisco, CA (US); Tanin Na Nakorn, Bellevue, WA (US); Stefan Gawrys, Seattle, WA (US); Arne Roomann-Kurrik, San Franciso, CA (US)

(73) Assignee: Stripe, Inc., San Francisco, CA (US)

( * ) Notice: Subject to any disclaimer, the term of this patent is extended or adjusted under 35 U.S.C. 154(b) by 101 days.

(21) Appl. No.: 17/223,329

(22) Filed: Apr. 6, 2021

(65) Prior Publication Data

US 2022/0318864 A1  Oct. 6, 2022

(51) Int. Cl.
*G06Q 30/04* (2012.01)
*G06F 16/22* (2019.01)

(52) U.S. Cl.
CPC ......... *G06Q 30/04* (2013.01); *G06F 16/2291* (2019.01)

(58) Field of Classification Search
CPC ...... G06Q 30/04; G06Q 20/14; G06Q 20/102; G06F 16/2291
USPC .......................................................... 705/34
See application file for complete search history.

(56) References Cited

U.S. PATENT DOCUMENTS

| 10,037,263 B1* | 7/2018 | Kegley | G06F 11/3688 |
| 2010/0063937 A1* | 3/2010 | How | G06Q 30/04 |
| | | | 715/764 |
| 2013/0332324 A1* | 12/2013 | Mischell | G06Q 40/06 |
| | | | 705/30 |
| 2015/0212920 A1 | 7/2015 | Kraus et al. | |
| 2015/0378877 A1 | 12/2015 | Bhattacharya | |
| 2017/0220938 A1* | 8/2017 | Sainani | G06F 16/248 |
| 2017/0336972 A1 | 11/2017 | Shaw et al. | |
| 2018/0101470 A1* | 4/2018 | Shazly | G06F 11/3696 |
| 2018/0196731 A1 | 7/2018 | Moorthi et al. | |

(Continued)

FOREIGN PATENT DOCUMENTS

WO   WO-2009018736 A1 *  2/2009  ............. H04L 12/14

OTHER PUBLICATIONS

"International Application Serial No. PCT/US2022/022910, International Search Report dated Jul. 25, 2022", 3 pgs.

(Continued)

*Primary Examiner* — Andrew Joseph Rudy
(74) *Attorney, Agent, or Firm* — Foley & Lardner LLP

(57) ABSTRACT

A clock data structure is introduced. An instance of the clock data structure can be attached to a billing data structure, such as a billing data structure that corresponds to a recurring payment. The instance of the clock data structure has a value that represents a frozen time—i.e., a specific time that does not change unless instructed to. The billing data structures to which the clock data structure is attached operate as if the real time is the frozen time on the clock. Since the time is frozen, users wishing to test the billing data structure can update their system configurations at specific times, and subsequently advance the time in the clock data structure instance to see the effects on those configurations, as well as on other parts of the system, including asynchronous messaging and processing, and processes that involve other entities.

20 Claims, 9 Drawing Sheets

(56) References Cited

U.S. PATENT DOCUMENTS

2020/0167750 A1    5/2020  P.
2020/0374105 A1*   11/2020 Padmanabhan ....... H04L 63/105

OTHER PUBLICATIONS

"International Application Serial No. PCT/US2022/022910, Written Opinion dated Jul. 25, 2022", 4 pgs.

* cited by examiner

600 →

| ARCHIVE TOKEN | SU_ARCHIVE_1IOXTPCICKIJWV8GYE7SPUZL | | |
|---|---|---|---|
| SAVED | 2021-02-25 00:39:47 (1614213587.964053) | | |

| FIELD | OLD VALUE | NEW VALUE |
|---|---|---|
| 602A CHECKED_UPCOMING_INVOICE_NOTIFICATION_INTERVALS.DAYS_7 | TRUE | FALSE |
| CURRENT_PERIOD_END | 2020-02-01 00:00:00 (1580515200) | 2020-03-01 00:00:00 (1583020800) |
| CURRENT_PERIOD_START | 2020-01-01 00:00:00 (1577836800) | 2020-02-01 00:00:00 (1580515200) |
| UPCOMING_INVOICE_CHECKUP_DATE | -- | 2020-02-23 00:00:00 (1582416000) |

604B ↗   602B ↗ NEW VALUE

| ARCHIVE TOKEN | SU_ARCHIVE_1IOXTCICKJWVS7UZTUNJN | | |
|---|---|---|---|
| SAVED | 2021-02-25 00:39:46 (1614213586.5873032) | | |

| FIELD | OLD VALUE | NEW VALUE |
|---|---|---|
| CLOCK_UPDATED | 2020-01-25 00:00:00 (1579910400.0) | 2020-02-01 00:00:00 (1580515200.0) |
| CYCLE_TOKEN | CYCLE_J0Z1OZBFRWXYGV | CYCLE_J0Z1GCD9EZTO8B |
| LATEST_INVOICE | IN_1IOXTACICKIJWVSK3VEDGN | IN_1IOXTNCICKIJWVSEV98JT0J |
| UPDATED | 2020-01-25 00:00:00 (1579910400.0) | 2020-02-01 00:00:00 (1580515200.0) |

606B ↗

| ARCHIVE TOKEN | SU_ARCHIVE_1IOXTCICKJWV8FFFRSKZL | | |
|---|---|---|---|
| SAVED | 2021-02-25 00:39:43 (1614213583.915713) | | |

| FIELD | OLD VALUE | NEW VALUE |
|---|---|---|
| UPCOMING_INVOICE_CHECKUP_DATE | 2020-01-25 00:00:00 (1579910400) | -- |
| CLOCK_UPDATED | 2020-01-01 00:00:00 (1577836800.0) | 2020-01-25 00:00:00 (1579910400.0) |
| CHECKED_UPCOMING_INVOICE_NOTIFICATION_INTERVALS.DAYS_7 UPDATED | FALSE 2020-01-01 00:00:00 (1577836800.0) | TRUE 2020-01-25 00:00:00 (1579910400.0) |

*FIG. 6*

DETERMINISTIC VALIDATION OF BILLING INTEGRATIONS THROUGH SIMULATED TIME

TECHNICAL FIELD

The subject matter disclosed herein generally relates to web-enabled and app-enabled billing and payment systems. Specifically, the subject matter pertains to deterministic validation of billing integrations through simulated time.

BACKGROUND

Web-enabled billing and payment systems enable companies to accept payments (typically credit card payments, although other types of payments are often additionally supported) via the Internet. Commonly a website or web application can be set up to coordinate with such a web-enabled billing and payment service such that when a user goes to make a purchase on the website or web application, a separate process is launched that completes the checkout and payment aspects, indeed, sometimes this separate process is hosted completely by the web-enabled billing and payment system and offsite from the website or a web server associated with the web application itself.

Entities operating such websites often will want to test the billing and payment system to ensure that it is properly integrated with the corresponding website or web application in a way that is free from both technical and billing errors. Commonly this is accomplished by placing the website in a test mode and initiating a sample transaction using dummy billing information, and then monitoring the billing and payment system and its integration with the website or application to ensure the dummy payment is processed correctly and that the corresponding website processes are launched (e.g., generation of a "thanks for your order" email with a receipt, reduction of inventory number for the purchased products, etc.).

While this test mode process works well for real-time and one-off transactions, it does not work well to test time-based transactions, such as recurring transactions (e.g., billing every month, or every year), or transactions that have a delay associated with them (e.g., orders on out of stock items that will not be billed until back in stock). Specifically, there currently is no way technologically to deterministically validate future transactions in a multi-entity system without simply waiting for the time for those transaction to occur (i.e., wait until the future transaction becomes a current transaction). This leads to instability for time-based transactions, as their integrations cannot be properly validated in a timely manner.

BRIEF DESCRIPTION OF THE DRAWINGS

Some embodiments are illustrated by way of example and not limitation in the figures of the accompanying drawings.

FIG. 6 is a diagram illustrating a screen capture of a log of events in accordance with an example embodiment.

DETAILED DESCRIPTION

Figure 1:
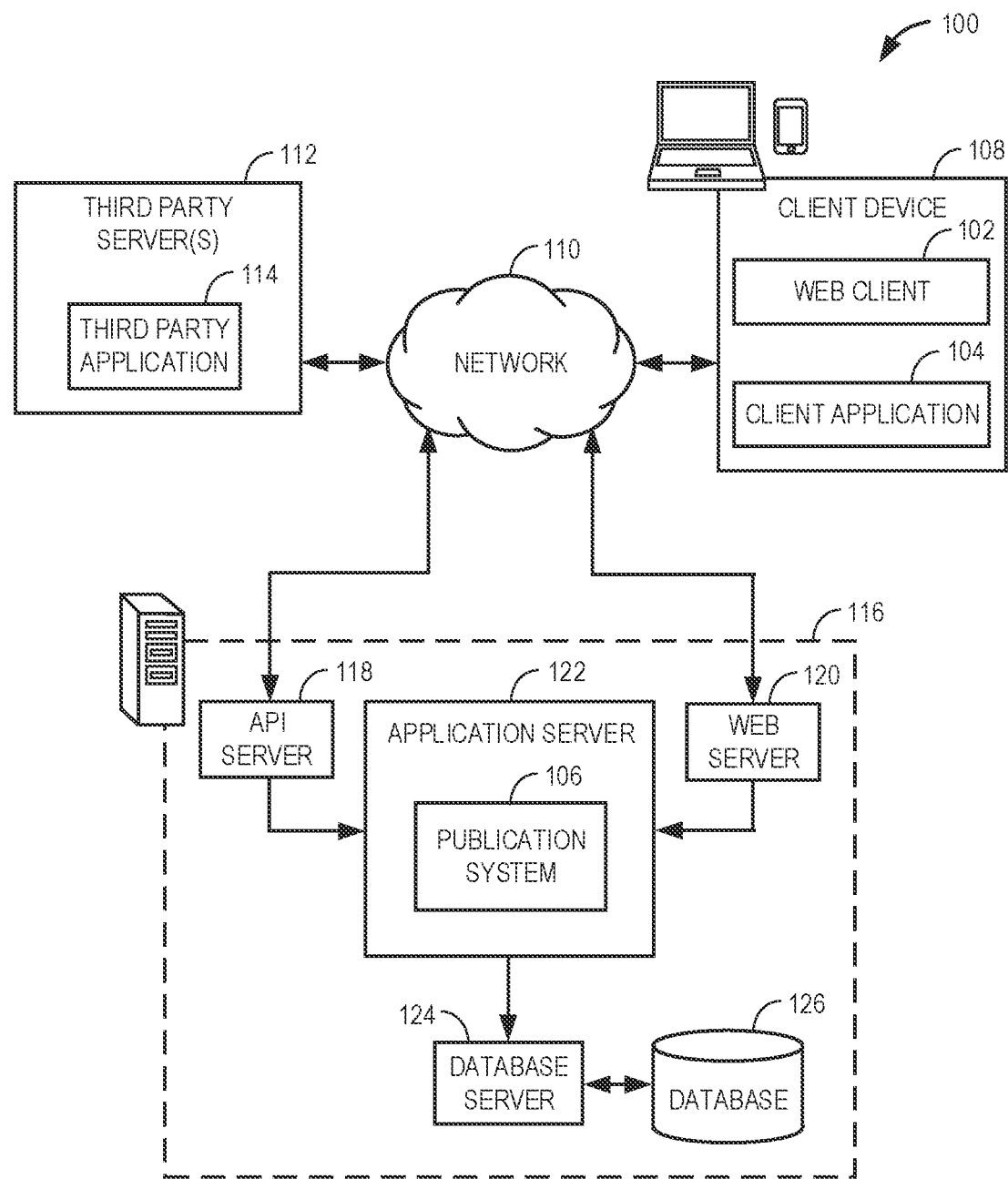
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, a clock data structure is introduced. An instance of the clock data structure can be attached to a billing data structure, such as a billing data structure that corresponds to a recurring payment. The instance of the clock data structure has a value that represents a frozen time—i.e., a specific time that does not change unless instructed to. The billing data structures to which the clock data structure is attached operate as if the real time is the frozen time on the clock. Since the time is frozen, users wishing to test the billing data structure can update their system configurations at specific times, and subsequently advance the time in the clock data structure instance to see the effects on those configurations, as well as on other parts of the system, including asynchronous messaging and processing, and processes that involve other entities. Thus, users are able to deterministically validate their payment integrations directly against a test mode provided by the payment provider.

It should be noted that the frozen time in the clock data structure instance can be any time in the past or future, and thus users can "reverse" time and alter past configurations, then restart time to reenact past events using different configurations, in addition to advancing into the future to test future-based billing transactions. At each time, the user is able to observe webhooks and state changes that occur. Once a clock data structure instance has advanced, specialized Application Program Interface (API) requests can be made that make assertions about the objects in the new time, or update those objects, to allow for modeling and testing of complex billing scenarios.

As such, in an example embodiment, a testmode-only API (here named v1/test/clocks) is introduced that enables creation, advancement, and deletion of clock data structure instances. These clock data structure instances can be passed to child objects, such as during customer or quote creation, and all related objects will inherit the clock data structure instance. As such, all timestamp fields on these related billing objects will respect the clock's frozen time.

In an example embodiment, the testmode-only API is provided only for billing objects. Payment objects are not included, and will continue to use the system time and ignore the clocks.

Billing objects include, for example, customer, quote, subscription, subscription schedule, invoice, and invoice item objects.

Furthermore, in recurring payments, the next payment is often reliant on the state of the history of payments. For example, the next invoice that a customer receives may be adjusted based on how much credit they have, how much they owe from previous cycles, or how many times a discount has been used. When onboarding onto a new recurring payment management system, getting the right historical state can be complicated to get right. This becomes error prone and creates a lot of burden on users getting it right. Additionally, during migration, historical information is often lost.

Thus, in an example embodiment, through the use of a clock data structure instance, an onboarding user with history in another recurring billing provider can create the original scenario for the recurring payments, with the historical start time of recurring payment, and then roll time forward. By recreating and fast forwarding through history using the clock, once the clock hits the current real time, the state of the recurring payment objects should be identical to the state that exists in the other recurring billing provider. At this point, the user can detach the clock from the recurring payment, such that the recurring payment will use real time going forward. This essentially takes the objects created during the test mode and moves them to live mode. Not only does this allow the correct state of the recurring payment object to be set up, it also transfer the history of operations that occurred in the other recurring billing provider. The transference between simulated and real time allows easy set up of any recurring billing for migration scenarios.

Essentially, the merchant would set the clock back in time to some critical time point in the past, then advance the clock to the current time. When the clock hits the current time, the objects created during the time period from that critical time point to the current time would be migrated over to live mode. Due to the nature of the clock data structure instance and how it is attached to objects, this transference of test mode objects to live mode objects can be accomplished seamlessly as the same clock data structure instance would have been attached to all created or modified objects during that time period. In other words, the system can then easily transfer all objects attached to the same clock data structure to live mode at one. This eliminates the need for costly graph traversal algorithms that would ordinarily have needed to be run to validate the dependencies of all objects created or modified.

If one wished for more granular selection of objects to be transferred from test mode to billing mode (such as transferring one subscription for a customer to live mode but leaving another subscription for that same customer in test mode), then some sort of graph traversal algorithm would still need to be used, but the presence of the clock data structure instance at least allows the synchronizing of time between test mode objects and live mode objects to be performed seamlessly.

It should be noted that while the above describes use of this technique for the migration of data from another payment provider, the same technique could be used in cases where test mode objects with the same payment provider are desired to become live mode objects.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, Calif. (herein "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
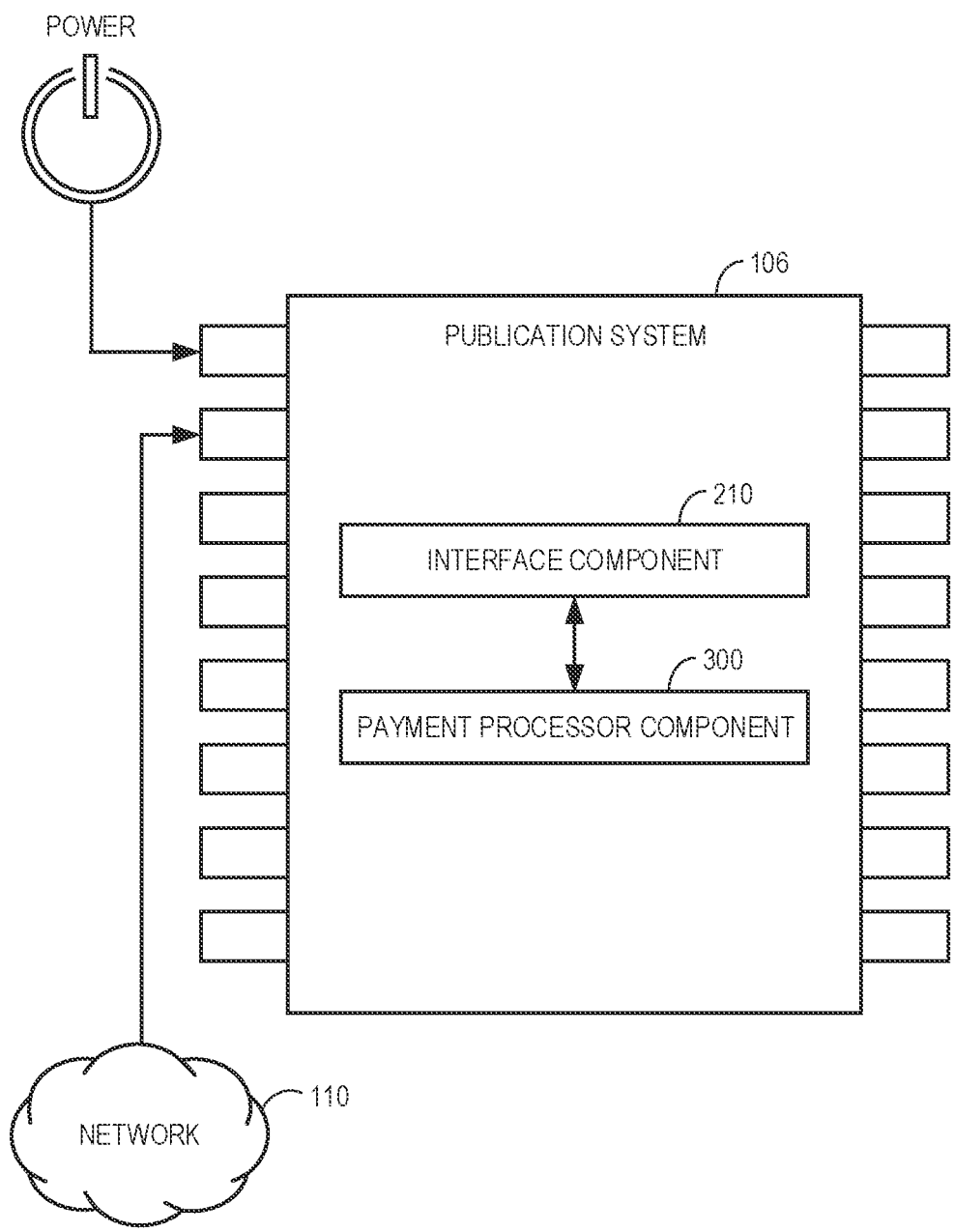
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor in accordance with the methods described herein with reference to the accompanying drawings.

Figure 3:
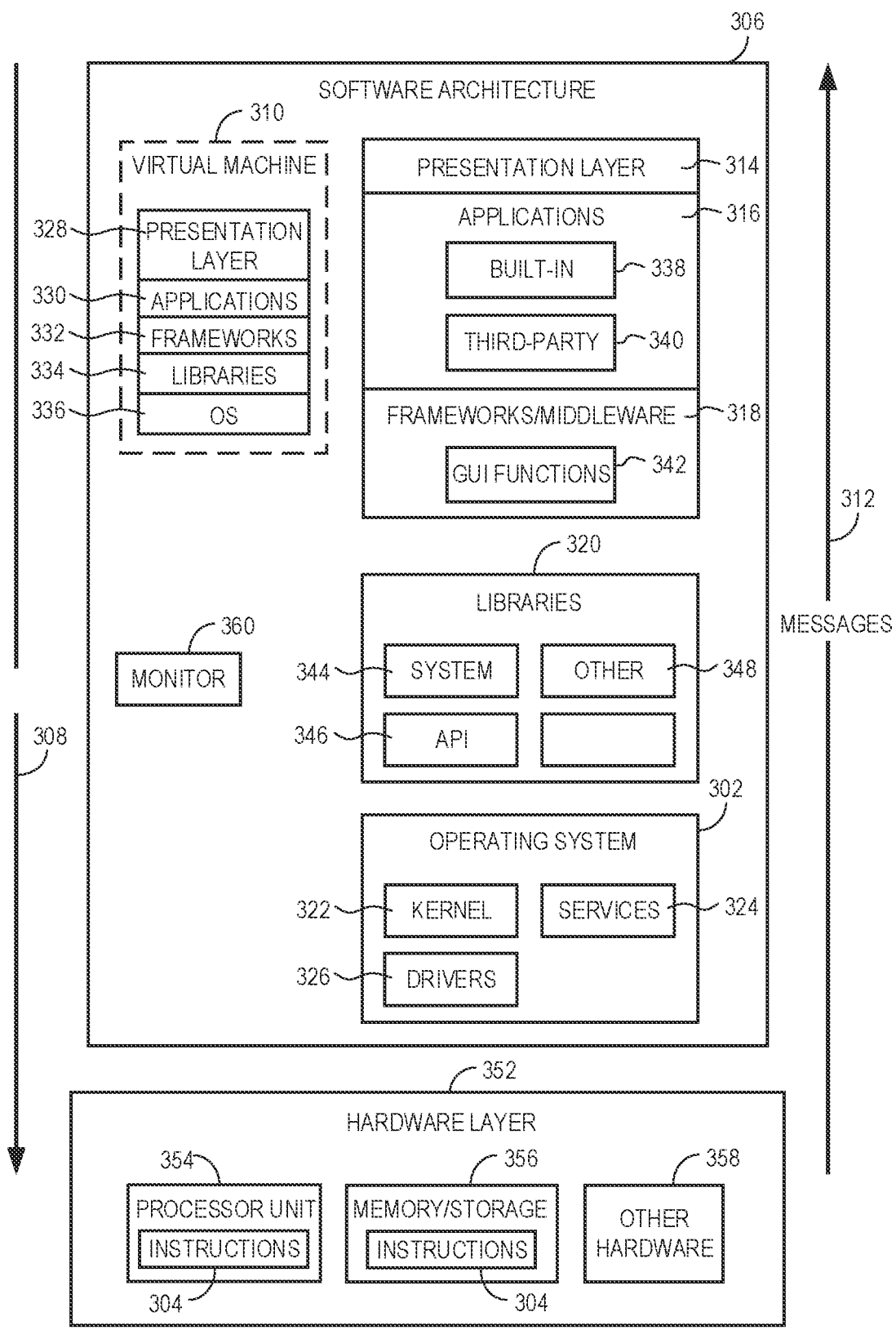
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, PG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™ ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
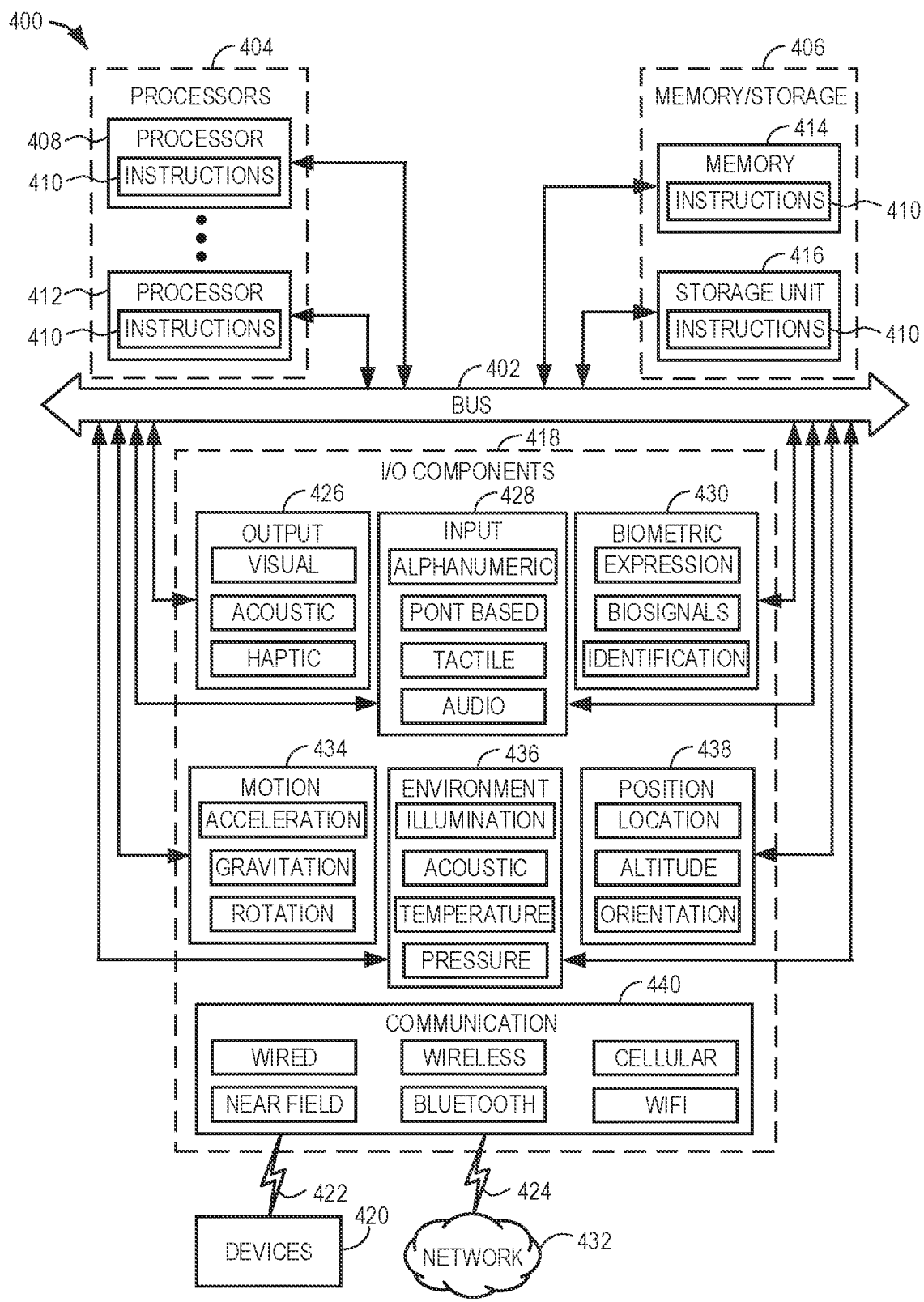
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Figure 5:
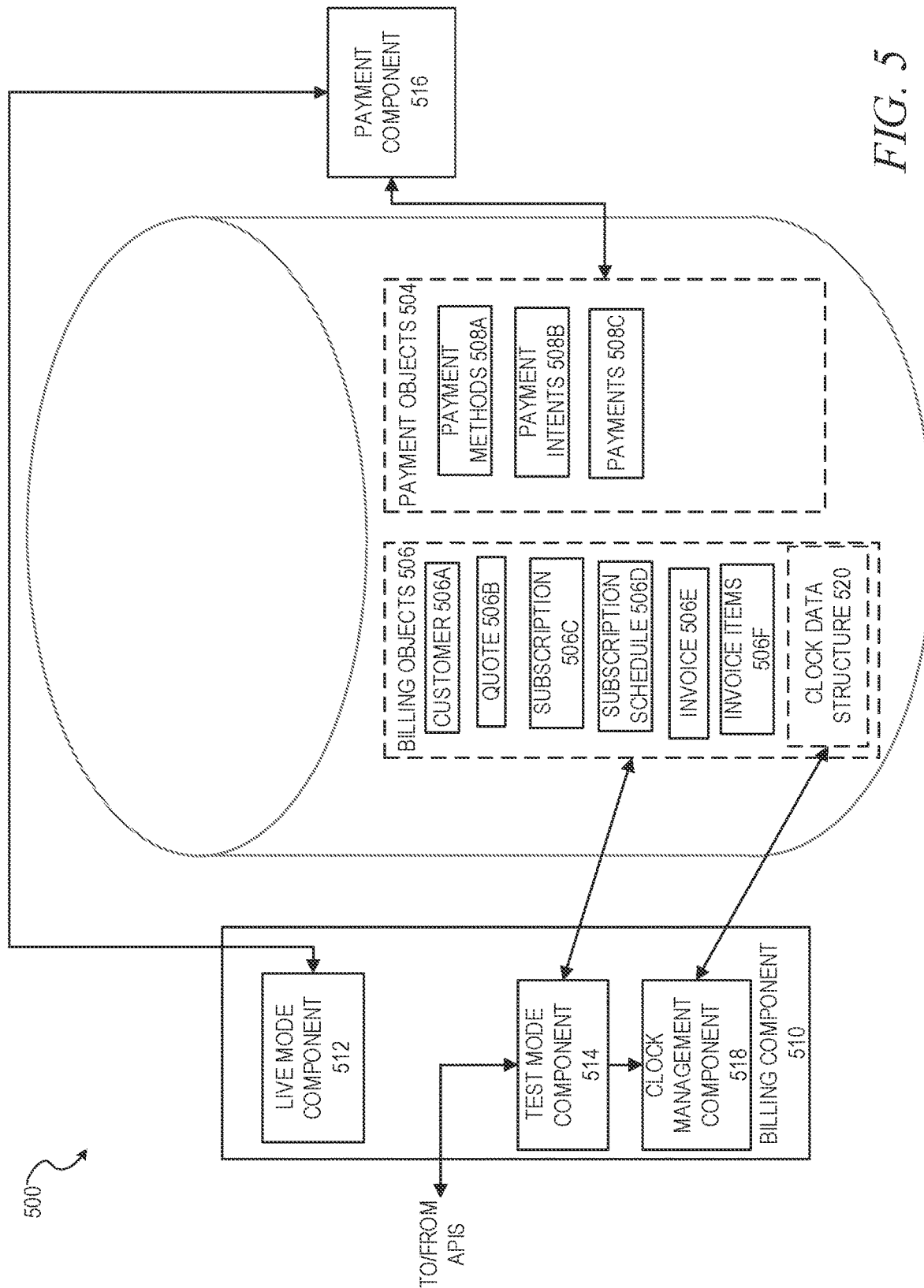
FIG. 5 is a block diagram illustrating a payment processor component in more detail, in accordance with an example embodiment.

In an example embodiment, the payment processor component 300 may contain functionality to both generate invoices and receive and process payments. Furthermore, the payment processor component 300 may contain functionality for such invoice generation and payment processing functionalities. FIG. 5 is a block diagram illustrating a payment processor component 300 in more detail, in accordance with an example embodiment.

The payment processor component 300 includes an object repository 500. The object repository 500 stores instantiated instances of various types of objects used in the processes of the payment processor component 300. For simplicity, these object instances have been divided into two groups: billing objects 506 and payment objects 504. Billing objects 506 include objects that are relevant to the function of generating invoices or other billing-related tasks. Examples include Customer 506A, Quote 506B, Subscription 506C, Subscription Schedule 506D, Invoice 506E, and Invoice Items 506F. Payment objects 504 include objects that are relevant to the functions of receiving and processing payments. Examples include Payment Methods 508A, Payment Intents 508B, and Payments 508C. It should be noted that there may be other groups of objects not depicted here. For purposes of this disclosure, the focus is on the distinction between billing objects 506 and any other objects in the object repository 500.

A billing component 510 may implement the various billing-related functionalities, including invoice generation and distribution, which includes time-related invoices such as recurring invoices. It interfaces with the object repository 500 to instantiate, utilize, and delete instances of billing objects 506. More particularly, it may include a live mode component 512 and a test mode component 514. The live mode component 512 acts to operate the instantiated objects in a live mode, meaning that events and web hooks that are generated in the mode are both non-ephemeral (i.e., they remain in existence forever, until deleted) and affect outside systems (i.e., bills actually are sent to customers and payments caused to process). It also coordinates with a payments component 516 to actually receive and process payments.

The test mode component 514 acts to operate the instantiated billing objects 506 in a test mode, meaning that the events and web hooks that are generated in the mode are ephemeral (i.e., they are lost when switching to live mode) and do not necessarily affect outside systems (it is possible that some effects will be felt on outside systems, but these would normally be ones having only an ephemeral effect, such as receiving a dummy invoice).

The test mode component 514 may receive commands from users, such as merchants, to place a website or web application in test mode. In an example embodiment, a clock management component 518 additionally receives commands from the users to establish and use clock data structure instances during the test mode. The clock management component 518 may receive these commands via one or more APIs. In an example embodiment, these APIs communicate the commands using a Representational State Transfer (REST) protocol.

In response to these commands, the clock management component 518 may instantiate one or more clock data structures in the objects repository 500. It may also, as described earlier, attach the clock data structure instances to billing object instances. It may then coordinate with the test mode component 514 to operate the billing object instances in test mode, advancing and potentially reversing clocks in the clock data structure instances using a clock data structure 520 as per commands from the users.

The following is example code for an API to create a clock data structure instance in accordance with an example embodiment:

```
POST /v1/test/clocks -u sk_test_ABC: \
{
    frozen_time: timestamp,
}
->
{
    id: 'clock_abc',
    object: 'test.clock',
    livemode: false,
    status: 'ready',
    frozen_time: timestamp,
    created: timestamp, // current system time
    deletes_after: timestamp, // 1 month from created time
}
```

A test clock created webhook will fire when a clock data structure instance is created.

This creates a test clock object having the id of "clock_abc", with an indication that it is not in livemode (i.e., it is in test mode). It also provides the ability to have the test.clock be automatically deleted after a certain time, for example 1 month after created.

A particular clock data structure instance may be retrieved by specifying an ID and using the command:
GET /v1/test/clocks/:id -u sk_test_ABC:

While all clock data structures may be retrieved using the command:
GET /v1/test/clocks -u sk_test_ABC:

A test.clock.deleted webhook will fire when a Clock is deleted. Customers, Subscriptions, and Invoice objects will be deleted, canceled, and paused asynchronously.

Advancing time for a clock data structure instance may be performed using the following example API:

```
POST /v1/test/clocks/:id/advance -u sk_test_ABC: \
{
  frozen_time: timestamp,
}
->
{
  id: 'clock_abc',
  object: 'test.clock',
  livemode: false,
  status: 'advancing',
  livemode: false,
  frozen_time: timestamp,
  created: timestamp,
  deletes_after: timestamp, // 1 month from created time
}.
This will also fire a test.clock.advancing webhook.
Once the advance has completed, a test.clock.ready webhook may also be fired.
Creating a customer object with a clock data structure instance may be
performed using the following API:
POST /v1/customers -u sk_test_ABC:
{
  ...
  clock: ?string,
  ...
}
->
{
  ...
  clock: ?string,
  ...
}
Creating a quote object with a clock data structure instance may be performed
using the following API:
POST /v1/customers -u sk_test_ABC:
{
  ...
  clock: ?string,
  ...
}
->
{
  ...
  clock: ?string,
  ...
}
```

An example use case follows of an annual invoice for a recurring annual payment. First, a clock data structure instance may be created in test mode with a frozen time as follows:

```
curl /v1/test/clocks -u sk_test_ABC: -X POST \
{
  frozen_time: 1577836800,
}
->
{
  id: 'clock_abc',
  status: 'ready',
  frozen_time: 1577836800,
  deletes_after: 1580515200, // 30 days from current time
  ...
}
Then a test mode customer object with the attached clock data structure instance
can be created as follows:
curl /v1/customers -u sk_test_ABC: -X POST \
{
  name: 'Test customer',
  clock: 'clock_abc',
```

```
}
->
{
  id: 'cus_test',
  name: 'Test customer',
  clock: 'clock_abc',
  ...
}
```

Now, an annual subscription can be created for that customer. The clock data structure is automatically attached to the subscription as it inherits the clock data structure from its parent (customer) object.

```
curl /v1/subscriptions -u sk_test_ABC: -X POST \
{
  customer: 'cus_test',
  items: [{
    price: 'annual_silver',
    quantity: 1,
  }],
  expand: ['latest_invoice'],
}
->
{
  id: 'sub_test',
  created: 1577836800, // the frozen time!
  current_period_start: 1577836800, // the frozen time!
  clock: 'clock_abc',
  ...
  latest_invoice: {
    created: 1577836800, // the frozen time!
    ...
  },
}
```

Next, the time may be advanced on the clock data structure instance. After the call to the advance API, the clock is synchronously updated to status: 'advancing' and a test.clock.advancing webhook may be fired.

```
curl /v1/test/clocks/clock_abc/advance -u sk_test_ABC: -X POST \
{
  frozen_time: 1580515200,
}
->
{
  id: 'clock_abc',
  status: 'advancing',
  frozen_time: 1579046400,
  ...
```

The payment processor may then may asynchronously find and run all of the updates that need to occur to that Subscription between the old frozen time and the new frozen time. Once the advancement is complete, a test.clock.ready webhook can be fired and the user can continue.

test.clock.ready
```
{
  id: 'clock_abc',
  status: 'ready',
  frozen_time: 1580515200,
  ...
}
```

Now, the user can upgrade the annual subscription (one month in) to simulate prorations:

```
curl /v1/subscriptions/sub_test -u sk_test_ABC: -X POST \
{
  items: [{
    id: 'si_abc',
    price: 'annual_gold',
  }],
  proration_behavior: 'create_prorations',
}
```

This will create an Invoice Items object for prorations and customer.subscription.updated/invoiceitem.created webhooks will fire. Now the user advances the clock data structure instance until the next cycle by using the timestamp from the subscription's current_period_end:

```
curl /v1/test/clocks/clock_abc/advance -u sk_test_ABC: -X POST \
{
  frozen_time: 1609459200,
}
->
{
```

```
    id: 'clock_abc',
    frozen_time: 1580515200,
    status: 'advancing',
    ...
}
```

The payment processor will then create an Invoice object for this Subscription. Once the test.clock.ready webhook has been received, the Subscription can be retrieved in the API and the new latest_invoice can be seen.

The user has advanced to the creation of the next Invoice, but the Invoice won't finalize for another hour. The user might want to see the Invoice finalized, so the user can advance another hour:

```
curl /v1/test/clocks/clock_abc/advance -u sk_test_ABC: -X POST \
{
    frozen_time: 1609462800,
}
->
{
    id: 'block_abc',
    status: 'advancing',
    frozen_time: 1609459200,
    ...
}
```

If the user retrieves the Invoice again in the API, the user will see an Invoice created at 1609459200 and finalized at 1609462800.

The user can write assertions that the Invoice objects contain the correct items and have the correct total amount due.

Once finished with a scenario, the user may optionally delete the Clock to clean up the testmode environment:
curl /v1/test/clocks/clock_abc-u sk_test_ABC: -X DELETE In an example embodiment, the billing clock data structure is a token.

Additionally, in an example embodiment, merchant integrations may be tested by going forwards and backwards through time. However, if one advances too far into the future, then all events and state transitions that occurred during the advancement time period are received. The merchant may want to step back and isolate a part of the process without recreating the resources from scratch. This is where the solution of rewinding time that was previously advanced in order to test recurring payments integration comes into play. A merchant performs a first test mode run-through by setting a clock sometime in the past and advancing it to a particular time. After rewinding back to some earlier point (preferably at least after the starting point for the initial test mode run, although this is not mandatory), the merchant may deviate from the previous timeline by modifying the resources and continuing the advancement of time to produce different results. The historical state is now forked and processes that rely on the state of the billing universe will now have two separate snapshots of the system. Each of these snapshots/timelines may be saved so that they can be compared.

This is accomplished by keeping a log or ledger of all events and web hooks that fired during the forward advancement of the clocks. The events in this ledger can then be reversed when the merchant sends the command to reverse the clock. Hence, the clock API may include a command to reverse the clock, which includes in it procedures for checking the log or ledger for all events that occurred from the current clock time to the specified reversal point, and then undoing all of those events.

FIG. 6 is a diagram illustrating a screen capture of a log 600 of events in accordance with an example embodiment. The log 600 includes three events, each with a separate archive token 602A, 604A, 606A. For each of these events, a separate table 602B, 604B, 606B is maintained with information about the fields that changed during the events, and for each of those fields, the old and new values before and after the event.

As mentioned earlier, each of the snapshots/timelines may be saved so that they can be compared. Saving them both also helps resolve ambiguities as each timeline version of a particular event/webhook will have its own ID but have an indication that they represent different timelines. This also eliminates any issues that might have been caused from performing analytics on invoices generated during these time periods. For example, in an initial test run, an invoice for customer X may have been generated at time Y. Then, the merchant may reverse time and advance it again, once again generating the invoice for customer X at time Y. For analytics purposes, unless there is some way to determine that the first invoice and the second invoice are actually the same invoice on separate timelines, the analytics component may assume that they represent two different invoices and may output incorrect data, such as an indication of an amount owed by customer X that is twice as high as it should be.

Figure 7:
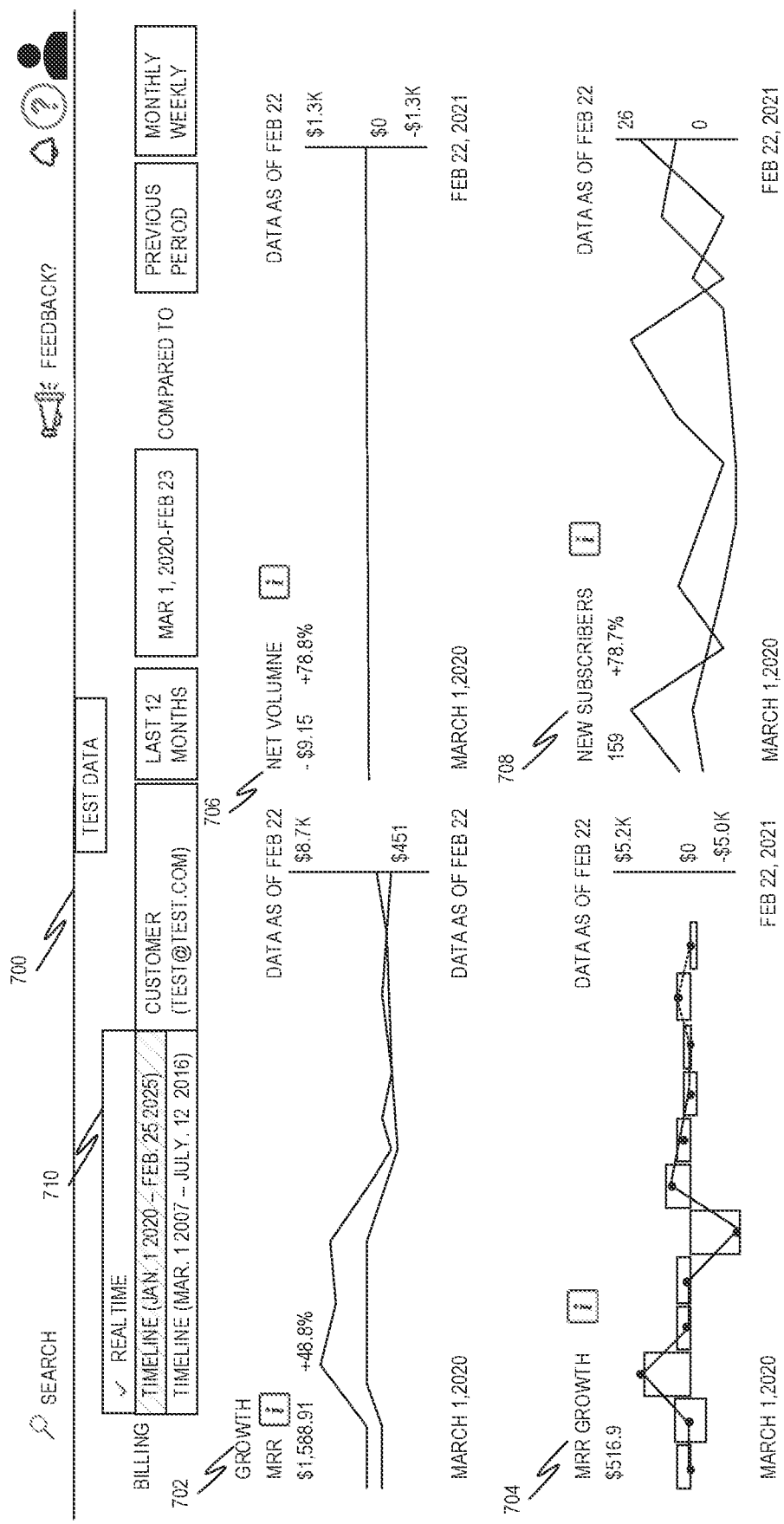
FIG. 7 is a diagram illustrating a screen capture of an analytics screen in accordance with an example embodiment.

FIG. 7 is a diagram illustrating a screen capture of an analytics screen 700 in accordance with an example embodiment. Here, a billing screen is depicted, showing monthly recurring revenue (MRR) 702, MRR growth 704, net volume 706, and new subscribers 708. Notably, the figures shown are for a single timeline. A dropdown 710 allows the user to select from among real time, a first timeline, and a second timeline. This selection causes the corresponding values to be updated in each of the areas 702, 704, 706, and 708.

Figure 8:
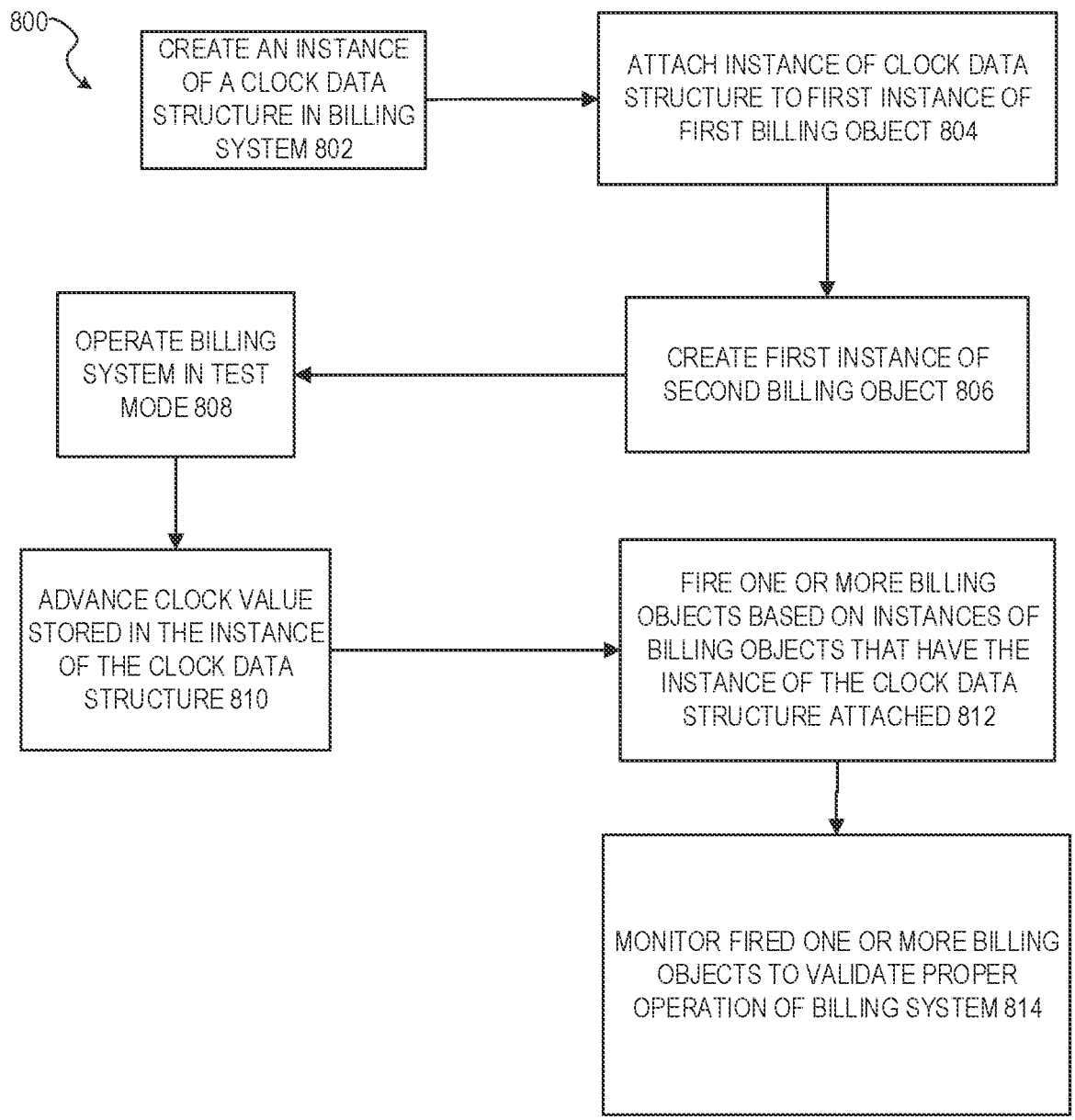
FIG. 8 is a flow diagram illustrating a method for operating a clock data structure instance in accordance with an example embodiment.

FIG. 8 is a flow diagram illustrating a method 800 for operating a clock data structure instance in accordance with an example embodiment. At operation 802, an instance of a clock data structure is created in a billing system. At operation 804, the instance of the clock data structure is attached to a first instance of a first billing object in the billing system. At operation 806, a first instance of a second billing object is created that is a descendant of the first instance of the first billing object. This includes automatically inheriting the instance of the clock data structure from the first instance of the first billing object.

Then at operation 808, the billing system is operated in a test mode. At operation 810, a clock value stored in the instance of the clock data structure is advanced. At operation 812, in response to the advancing, one or more billing events based on instances of billing objects that have the instance of the clock data structure attached are fired. At operation 814, the fired one or more billing; events are monitored to validate proper operation of the billing system.

Figure 9:
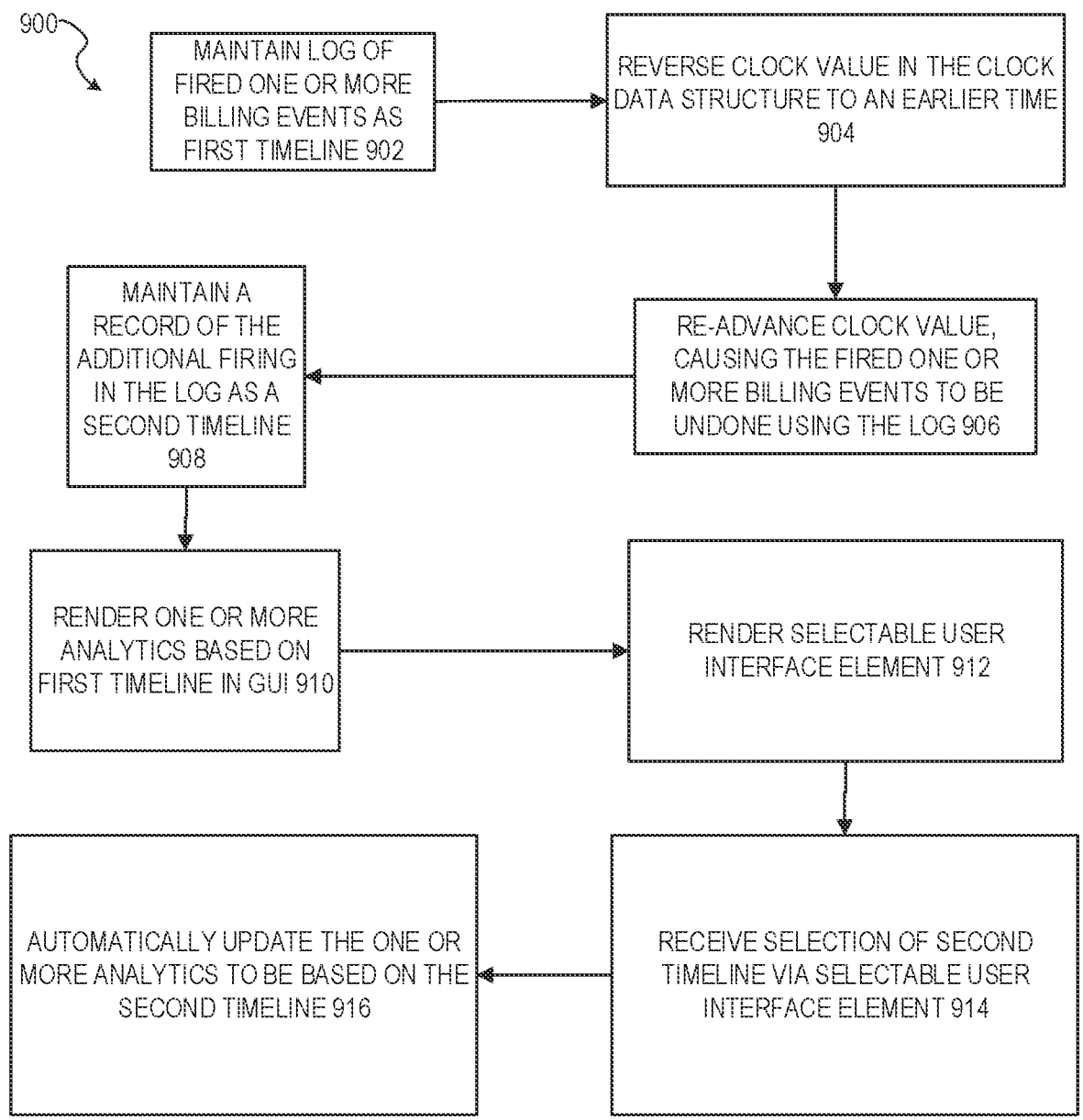
FIG. 9 is a flow diagram illustrating a method for maintaining multiple timelines of fired events, in accordance with an example embodiment.

FIG. 9 is a flow diagram illustrating a method 900 for maintaining multiple timelines of fired events, in accordance with an example embodiment. This method 900 may be performed in conjunction with the method 800 of FIG. 8. At operation 902, a log of fired one or more billing events is maintained as a first timeline. At operation 904, the clock value in the clock data structure is reversed to an earlier time, causing the fired one or more billing; events to be undone using the log. At operation 906, the clock value is re-advanced, causing additional firing of one or more billing events based on instances of billing objects that have the instance of the clock data structure attached. At operation 908, a record of the additional firing is maintained in the log as a second timeline.

At operation 910, one or more analytics based on the first timeline are rendered in a graphical user interface. At operation 912, a selectable user interface element allowing a user to select among the first timeline and the second timeline is rendered in the graphical user interface. At operation 914, a selection of the second timeline is received via the selectable user interface element. At operation 916, in response to the receiving, the one or more analytics are automatically updated to be based on the second timeline.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having, boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 404 in FIG. 4) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association—branded payment cards directly to consumers. An issuing bank assumes primary liability for the consumer's capacity to pay off debts they incur with their card.

"Payment information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in, can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2021, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject, matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    creating an instance of a clock data structure in a billing system;
    attaching the instance of the clock data structure to a first instance of a first billing object in the billing system;
    creating a first instance of a second billing object that is a descendant of the first instance of the first billing object, the creating the first instance of the second billing object including automatically inheriting the instance of the clock data structure from the first instance of the first billing object;
    operating the billing system in a test mode; and
    during the test mode:
    advancing a clock value stored in the instance of the clock data structure;
    in response to the advancing, firing one or more billing events based on instances of billing objects that have the instance of the clock data structure attached; and
    monitoring the fired one or more billing events to validate a proper operation of the billing system.

2. The method of claim 1, wherein the second billing object is a subscription billing object specifying an invoice to be generated at periodic intervals.

3. The method of claim 2, wherein the monitoring further comprises validating that the invoice to be generated at periodic intervals was correctly generated when the clock value advanced to time points at the end of the periodic intervals.

4. The method of claim 1, wherein the creating the instance of the clock data structure in the billing system and the attaching the instance of the clock data structure to the first instance of the first billing object in the billing system are each performed in response to separate requests received via separate Application Program Interfaces (APIs).

5. The method of claim 4, wherein the separate requests are received over the Representational State Transfer (REST) protocol.

6. The method of claim 1, further comprising:
    maintaining a log of the fired one or more billing events as a first timeline;
    reversing the clock value in the clock data structure to an earlier time, causing the fired one or more billing events to be undone using the log;
    re-advancing the clock value, causing additional firing of one or more billing events based on instances of billing objects that have the instance of the clock data structure attached; and
    maintaining a record of the additional firing in the log as a second timeline.

7. The method of claim 6, further comprising:
    rendering, in a graphical user interface, one or more analytics based on the first timeline;
    rendering, in the graphical user interface, a selectable user interface element allowing a user to select among the first timeline and the second timeline;
    receiving, via the selectable user interface element, a selection of the second timeline; and in response the receiving, automatically updating the one or more analytics to be based on the second timeline.

8. The method of claim 1, further comprising:
receiving a request to transfer billing objects with the first instance of the clock data structure attached to a live mode; and
in response to the receiving the request and in response to the clock value advancing to a current time, automatically transferring all instances of billing objects having the first instance of the clock data structure attached to the live mode.

9. A system comprising:
a network;
one or more processors; and
a memory storing instructions that, when executed by at least one processor among the one or more processors, cause the at least one processor to perform operations comprising:
creating an instance of a clock data structure in a billing system;
attaching the instance of the clock data structure to a first instance of a first billing object in the billing system;
creating a first instance of a second billing object that is a descendant of the first instance of the first billing object, the creating the first instance of the second billing object including automatically inheriting the instance of the clock data structure from the first instance of the first billing object;
operating the billing system in a test mode; and
during the test mode:
advancing a clock value stored in the instance of the clock data structure;
in response to the advancing, firing one or more billing events based on instances of billing objects that have the instance of the clock data structure attached; and
monitoring the fired one or more billing events to validate proper operation of the billing system.

10. The system of claim 9, wherein the second billing object is a subscription billing object specifying an invoice to be generated at periodic intervals.

11. The system of claim 10, wherein the monitoring further comprises validating that the invoice to be generated at periodic intervals was correctly generated when the clock value advanced to time points at the end of the periodic intervals.

12. The system of claim 9, wherein the creating the instance of the clock data structure in the billing system and the attaching the instance of the clock data structure to the first instance of the first billing object in the billing system are each performed in response to separate requests received via separate Application Program Interfaces (APIs).

13. The system of claim 12, wherein the separate requests are received over the Representational State Transfer (REST) protocol.

14. The system of claim 9, wherein the operations further comprise:
maintaining a log of the fired one or more billing events as a first timeline;
reversing the clock value in the clock data structure to an earlier time, causing the fired one or more billing events to be undone using the log;
re-advancing the clock value, causing additional firing of one or more billing events based on instances of billing objects that have the instance of the clock data structure attached; and
maintaining a record of the additional firing in the log as a second timeline.

15. The system of claim 14, wherein the operations further comprise:
rendering, in a graphical user interface, one or more analytics based on the first timeline;
rendering, in the graphical user interface, a selectable user interface element allowing a user to select among the first timeline and the second timeline;
receiving, via the selectable user interface element, a selection of the second timeline; and
in response the receiving, automatically updating the one or more analytics to be based on the second timeline.

16. The system of claim 9, wherein the operations further comprise:
receiving a request to transfer billing objects with the first instance of the clock data structure attached to a live mode; and
in response to the receiving the request and in response to the clock value advancing to a current time, automatically transferring all instances of billing objects having the first instance of the clock data structure attached to the live mode.

17. A non-transitory machine-readable medium comprising instructions which, when read by a machine, cause the machine to perform operations comprising:
creating an instance of a clock data structure in a billing system;
attaching the instance of the clock data structure to a first instance of a first billing object in the billing system;
creating a first instance of a second billing object that is a descendant of the first instance of the first billing object, the creating the first instance of the second billing object including automatically inheriting the instance of the clock data structure from the first instance of the first billing object;
operating the billing system in a test mode; and
during the test mode:
advancing a clock value stored in the instance of the clock data structure;
in response to the advancing, firing one or more billing events based on instances of billing objects that have the instance of the clock data structure attached; and
monitoring the fired one or more billing events to validate proper operation of the billing system.

18. The non-transitory machine-readable medium of claim 17, wherein the second billing object is a subscription billing object specifying an invoice to be generated at periodic intervals.

19. The non-transitory machine-readable medium of claim 18, wherein the monitoring further comprises validating that the invoice to be generated at periodic intervals was correctly generated when the clock value advanced to time points at the end of the periodic intervals.

20. The non-transitory machine-readable medium of claim 18, wherein the creating the instance of the clock data structure in the billing system and the attaching the instance of the clock data structure to the first instance of the first billing object in the billing system are each performed in response to separate requests received via separate Application Program Interfaces (APIs).

* * * * *